United States Patent
Gutierrez (10) Patent No.: US 9,236,763 B2
(45) Date of Patent: Jan. 12, 2016

(54) DEVICE AND METHOD FOR DISTRIBUTING POWER AT A REMOTE PUMPING SYSTEM

(71) Applicant: Dresser Inc., Addison, TX (US)

(72) Inventor: Francisco Manuel Gutierrez, League City, TX (US)

(73) Assignee: Dresser, Inc., Addison, TX (US)

( * ) Notice: Subject to any disclaimer, the term of this patent is extended or adjusted under 35 U.S.C. 154(b) by 489 days.

(21) Appl. No.: 13/674,234

(22) Filed: Nov. 12, 2012

(65) Prior Publication Data

US 2014/0136001 A1 May 15, 2014

(51) Int. Cl.
G06F 19/00 (2011.01)
*H02J 7/35* (2006.01)
*H02J 3/32* (2006.01)

(52) U.S. Cl.
CPC .... *H02J 7/35* (2013.01); *H02J 3/32* (2013.01)

(58) Field of Classification Search
CPC ...................................... H02J 7/35; H02J 3/32
USPC ......................................................... 700/295
See application file for complete search history.

(56) References Cited

U.S. PATENT DOCUMENTS

| | | | |
|---|---|---|---|
| 5,293,892 A | 3/1994 | Fourqurean | |
| 6,590,793 B1 | 7/2003 | Nagao et al. | |
| 7,821,159 B2 | 10/2010 | Day | |
| 8,138,630 B2 * | 3/2012 | Dibachi et al. | 307/65 |
| 8,364,287 B2 * | 1/2013 | Pearson et al. | 700/11 |
| 2005/0001593 A1 | 1/2005 | Kawasumi et al. | |
| 2005/0218657 A1 | 10/2005 | Weesner et al. | |
| 2005/0275372 A1 | 12/2005 | Crowell | |
| 2008/0121272 A1 * | 5/2008 | Besser et al. | 136/248 |
| 2008/0179949 A1 * | 7/2008 | Besser et al. | 307/24 |
| 2008/0212343 A1 * | 9/2008 | Lasseter et al. | 363/39 |
| 2010/0109601 A1 | 5/2010 | Coyle et al. | |
| 2010/0312401 A1 | 12/2010 | Gutierrez et al. | |
| 2012/0053742 A1 * | 3/2012 | Tsuda | 700/291 |
| 2012/0074909 A1 * | 3/2012 | Hondo et al. | 320/128 |
| 2012/0143383 A1 * | 6/2012 | Cooperrider et al. | 700/295 |

FOREIGN PATENT DOCUMENTS

| | | |
|---|---|---|
| EP | 2669988 A1 | 12/2013 |
| WO | 9609677 A1 | 3/1996 |
| WO | 2012102128 A1 | 8/2012 |

OTHER PUBLICATIONS

Boyle, Godfrey. Renewable energy. ENME 519.21 Renewable Energy Practicum, Oxford university press, 2004.*
International Search Report and Written Opinion issued in connection with corresponding PCT Application No. PCT/US2013/069629 dated Nov. 10, 2014.

* cited by examiner

*Primary Examiner* — Michael D Masinick (74) *Attorney, Agent, or Firm* — Paul Frank + Collins P.C.

(57) ABSTRACT

Embodiments of devices and methods distribute power in a remote pumping system to avoid charge imbalances in energy storage devices of an array. These embodiments identify certain energy storage devices in the array in which the output voltage is less than or equal to a threshold value. In one example, power from a plurality of power sources is directed to the non-performing energy storage devices to expedite re-charging of these energy storage devices.

20 Claims, 5 Drawing Sheets

DEVICE AND METHOD FOR DISTRIBUTING POWER AT A REMOTE PUMPING SYSTEM

BACKGROUND

The subject matter disclosed herein relates to power management and distribution and, in one particular implementation, to power management in pump systems that operate at remote locations.

Extraction of natural resources (e.g., oil, natural gas, etc.) occurs in locations throughout the world. These locations are often found in remote regions, far from cities and towns and, likely, far removed from common sources of power, e.g., electrical power supplied by a power grid. Power is essential, however, to operate equipment (e.g., pumps) necessary to move resources from below the ground to pipelines and tanks for transport to other locales. At some sites, for example, pump systems inject chemicals (e.g., corrosion inhibitors) into wells to prevent pipeline corrosion, which can lead to leaks that discharge effluent at significant environmental and financial costs.

These pump systems make use of alternative power sources to operate pumps and other components in lieu of the electrical power supply via connection with the power grid. Although combustion-based devices (e.g., gas generators) may be used, preference is given to alternative energy sources (e.g., solar panels and wind turbines) to avoid fuel costs and hydrocarbon emissions. Some locations may also include storage devices to store energy from the alternative energy sources. The storage devices can supplement output from the alternative sources, e.g., during low-sun and/or low-wind conditions.

Batteries are one common type of storage device. Pump systems may utilize a number of batteries that form a system or an array. Examples of the array connect the batteries in parallel to meet the discharge and storage needs at each remote sight. However, batteries are known to discharge at slightly different rates. This characteristic can lead to voltage imbalances that impact the amount of current that is drawn from each battery found in the array. As a result, stronger batteries with charge levels that are relatively larger than the charge levels of weaker batteries in the array may tend to carry the weaker batteries when driving a load (e.g., the pump). Operation of the array in this manner can reduce the life-span of the batteries, which in turn will require maintenance at greater frequency to replace dead and/or under-performing batteries at the remote sight.

Solutions exist to avoid these discharge problems. The array may incorporate elements (e.g., diodes) to isolate common contact points. This solution can prevent stronger batteries from charging weaker batteries in the array. In other configurations, the array may include a DC/DC converter at each battery to maintain uniformity of the voltage levels at the common contact points. However, operation of the DC/DC converters and like devices draw power from the batteries, which reduces the total charge available to operate the pump system.

BRIEF DESCRIPTION OF THE INVENTION

This disclosure proposes improvements to address voltage imbalances across energy storage devices (e.g., batteries) in an array. As set forth below, the embodiments below utilize conditions (e.g., voltage) of the energy storage devices to allocate power across the array. For example, energy storage devices with charge levels below the charge level of other energy storage devices in the array can receive power necessary to increase charge levels and, ultimately, boost performance.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION OF THE INVENTION

Figure 1:
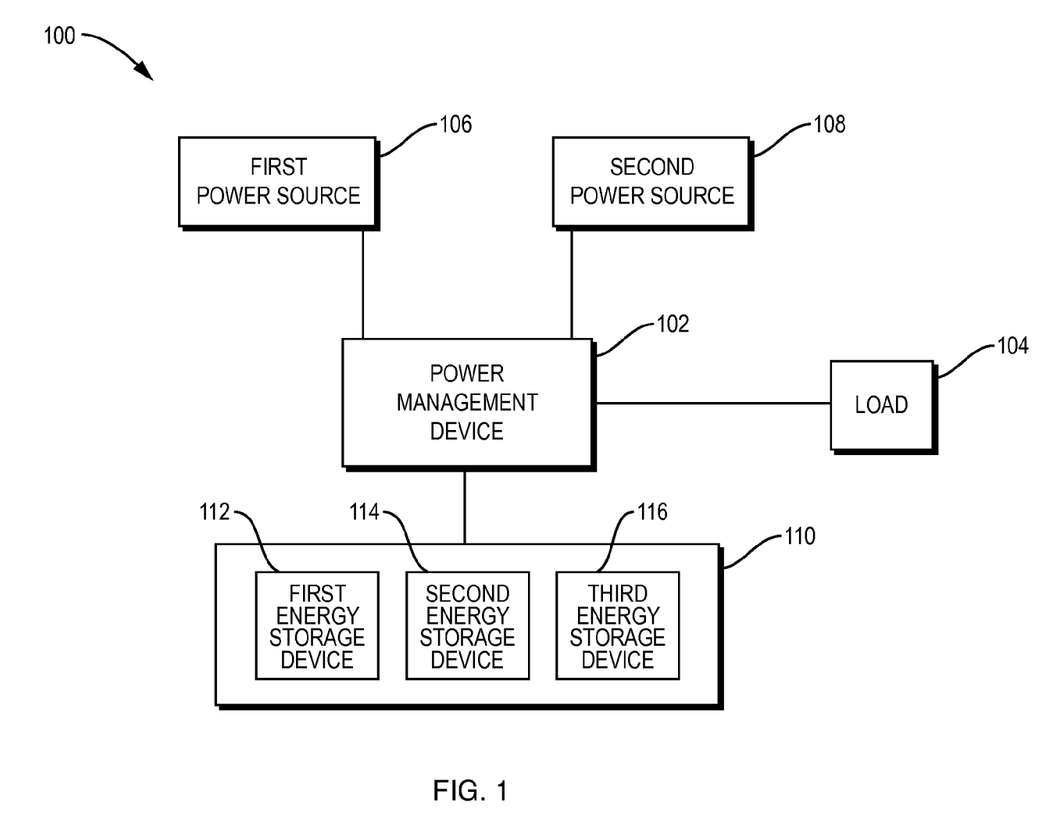
FIG. 1 depicts a schematic diagram of an exemplary embodiment of a remote pump system.

FIG. 1 illustrates an example of a remote pump system 100 (also "system 100") for use in locations where power is generally unavailable from conventional supplies, e.g., via the power grid. The system 100 includes a power management device 102 that couples with a load 104 (e.g., a pump). The power management device 102 also couples with one or more power sources (e.g., a first power source 106 and a second power source 108) and a peripheral power source, which in this example includes an array 110 of one or more energy storage devices (e.g., a first energy storage device 112, a second energy storage device 114, and a third energy storage device 116).

The power sources 106, 108 harvest energy from renewable and/or re-usable sources. Examples of these sources can incorporate solar panels and wind turbines, although this disclosure contemplates use of other power generating equipment (e.g., gas generators, fuel cells, etc.) as well. The power sources 106, 108 can also include fuel cells and similar devices that convert chemical energy to electricity. Collectively, these types of renewable or "green" technology may be preferred to reduce pollution and emission indicative of combustion-type devices. Moreover, use of sources that do not require fuels (e.g., gasoline, diesel, etc.) that would likely require less maintenance to re-fill depleted storage tanks with fuel.

The array 110 can include devices (e.g., the first energy storage device 112, the second energy storage device 114, the third energy storage device 116) that store, retain, and discharge energy to operate the load 104. This disclosure contemplates various types of devices for use as energy storage devices 112, 114. Generally, these devices can receive inputs (e.g., electrical power) that can change one or more operating characteristics of the energy storage device. The operating characteristics include voltage levels (also "charge levels"), which increase in response to the electrical power input from the power sources 106, 108. Exemplary devices can comprise fuel cells and batteries, e.g., lead acid, nickel cadmium (NiCd), nickel metal hydride (NiMH), lithium ion (Li-ion), and lithium ion polymer (Li-ion polymer), among many other combinations of constituent components that permit recharging of the energy storage devices.

The power management device 102 can process input signals and output signals to manage operation of the system 100. Devices for use in or as the power management device 102 may utilize circuits and circuitry with combinations of discrete electrical elements (e.g., transistors, resistors, capacitors, switches, etc.). The operation of these discrete electrical elements allow the power management device 102 to generate outputs in response to the various inputs as desired. In one example, the power management device 102 can employ processing elements in the form of a microprocessor (e.g., ASIC) and/or like configured central processing unit (CPU) that can process executable instructions, e.g., in the form of software, computer programs, firmware, etc. These types of processing elements can work in conjunction with various circuits to operate the system 100 as contemplated herein.

Input signals can be in the form of signals that encode information about operation (e.g., voltage levels, current levels, etc.) of the energy storage devices 112, 114, 116. These signals can also encode information about operation (e.g., output power) of the power sources 106, 108. The power management device 102, in one implementation, generate output signals that can encode instructions to direct output power from the power sources 106, 108 to the array 110, to the load 104, and combinations thereof. This feature can selectively utilize one or both of the power sources 106, 108 to recharge the energy storage devices 112, 114, 116. For purposes of one example, the second power source 108 may supplement charge the first power source 106 provides to the energy storage devices 112, 114, 116. The second power source 108 can supplement the charge, thereby causing recharging to occur more quickly than if only the first power source 106 was used for this purpose.

Figure 2:
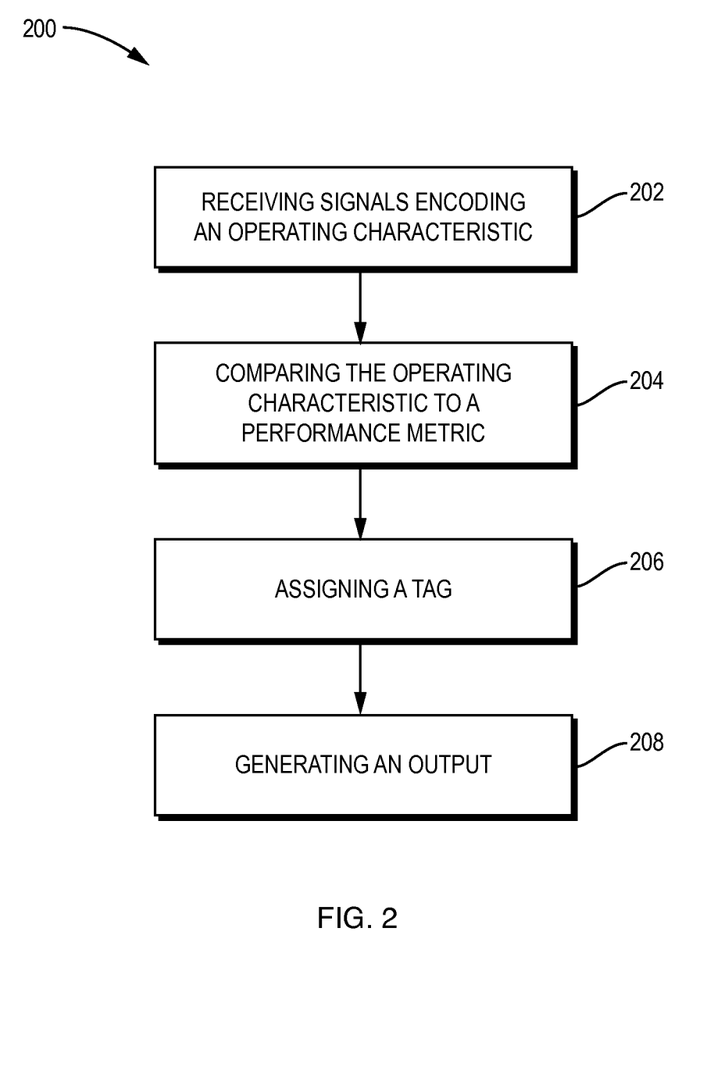
FIG. 2 depicts a flow diagram of an exemplary embodiment of a method for distributing power at a remote pump system.

FIG. 2 illustrates an exemplary method 200 that provides an advantageous way to distribute power that the power sources 106, 108 generate among the components of the system 100. The method 200 includes, at block 202, receiving signals encoding an operating characteristic for energy storage devices in an array and, a block 204, comparing the operating characteristic to a performance metric. The method 200 also includes, at block 206, assigning a tag to the energy storage devices in the array. In one embodiment, the tag includes a first tag that identifies energy storage devices with one or more operating characteristics that fail to satisfy the performance metric. The method 200 further includes, at block 208, generating an output encoding instructions to direct power from a first power source and a second power source to the energy storage devices in response to the presence of the first tag.

In one embodiment, the method 200 may also include steps for receiving inputs that also encode values for the performance metric and other parameters useful for determining power distribution. These inputs may arise from an end user, e.g., through a user interface and/or other implement through which the end user can interact to supply the inputs. Examples of the inputs include the number of energy storage devices in the array, the number of power sources, the type of power sources, and threshold values for the performance metrics.

With reference also to FIG. 1, embodiments of the method 200 help prevent charge differentials in systems like system 100. The signals from the energy storage devices 112, 114, 116 (e.g., at block 202) can encode any one of voltage, current, temperature, and resistance. In one example, the method 200 is configured to constantly query the energy storage devices 112, 114, thereby receiving information during operation of the system 100 to determine if any of the energy storage devices 112, 114, 116 are in need of charge or, in one example, in need of replacement. In other examples, queries may occur on a periodic basis, which can be defined by a pre-determined time period (e.g., minutes, hours, days, weeks, etc.)

The step of comparing the operating characteristic (e.g., at block 204) can use performance metrics that help identify operating differences among the energy storage devices 112, 114, 116 in the array 110. As mentioned above, the performance metric can identify a threshold value for the operating characteristics, e.g., a voltage threshold, a current threshold, a temperature threshold, etc. The threshold value can be pre-set and/or stored in memory as a pre-determined value. In other examples, the method 200 can include steps for calculating the threshold value as an average value across the energy storage devices in the array. This calculated average may be calculated across all of the energy storage devices or, in one example, across a subset that is less than all the energy storage devices as desired. The method 200 can execute these calculations periodically, e.g., only if there is a change in the number of available energy storage devices in the array.

The step of assigning the tag (e.g., at block 206) can help to distinguish between the stronger and weaker energy storage devices in the array. In one example, the tags identify energy storage devices as non-performing that, in one example, exhibit voltage levels that are at, equal to, and/or below a threshold value for the performance metric. The energy storage devices that are identified as the non-performing energy storage devices may require additional charge to return to proper performance levels. In one example, proper performance levels define charge levels for the energy storage device that are at maximum voltage and/or within 95% of maximum voltage.

The output (e.g., at block 208) can encode instructions that indicate how the system 100 allocates power across the system 100. The allocation may take into consideration power that is required to drive the load 104 of the system 100. Allocated power may also be necessary to boost performance (e.g., recharge) the tagged, non-performing energy storage devices. In one embodiment, the method 200 can include steps for designating the power sources 106, 108 as, for example, a primary source and a secondary source. Power from the primary source is used to operate the load 104 and other equipment that requires power in the system 100. Power from the primary power source can also help to recharge the non-performing energy storage devices. On the other hand, power from the secondary source is used to supplement the primary source to facilitate recharging of the non-performing energy storage devices.

Designation of the primary source and the secondary source may utilize signals that encode a power output level for the first power source 106 and the second power source 108. In one example, the power output level for the primary source is greater than the power output level for the secondary source. The method 200 may, in one embodiment, utilize other parameters (alone and/or in addition to power output level) to designate the power sources 106, 108 as the primary source and the secondary source. Examples of these parameters can identify the time of day, week, month, or year in which the power sources 106, 108 are likely to operate more effectively that the others. These chronological-type parameters may utilize a pre-programmed calendar, on which the particular designation of the primary source and the secondary source is found. This calendar may utilize the granularity of the calendar days or, more broadly, use the generally designated seasons (e.g., fall, winter, spring, summer). Collectively, the chronological feature may work appropriately to identify when to designate a solar panel as the primary power source (e.g., during daylight hours and/or in the summer) and when to designate a wind turbine as the primary power (e.g., during the winter time). In other examples, the parameters may include weather conditions (e.g., cloudy, windy, sunny, etc.) that indicate the optimal conditions in which the power sources will operate.

Figure 3:
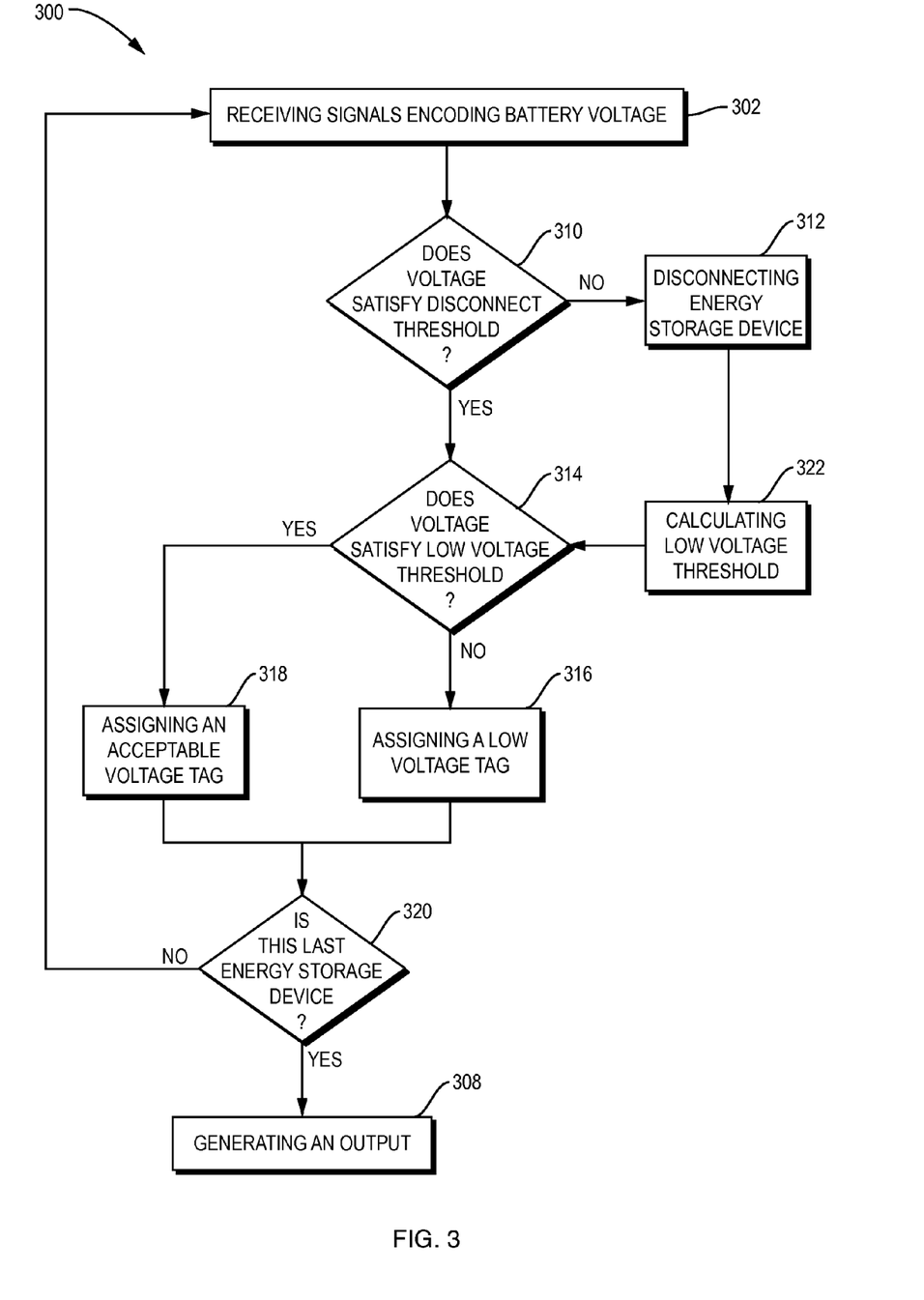
FIG. 3 depicts a flow diagram of another exemplary embodiment of a method for distributing power at a remote pump system.

FIG. 3 illustrates another example of a method 300 to distribute power from multiple power sources in a remote pump system. The method 300 includes, at block 310, comparing the voltage to a disconnect threshold, which defines the minimum voltage threshold that is acceptable for energy storage devices in the array. If the voltage level does not satisfy the disconnect threshold, then the method 300 includes, at block 312, disconnecting the energy storage device from the array. On the other hand, if the voltage level satisfies the disconnect threshold, then the method 300 continues at block 314, comparing the voltage level to a low voltage threshold valve. In one embodiment, if the first voltage does not satisfy the low voltage threshold value, the method 300 includes, at block 316, assigning a low voltage tag to the first energy storage device. If the first voltage satisfies the low voltage threshold value, then the method 300 includes, at block 318, assigning an acceptable voltage tag to the first energy storage device.

As shown in FIG. 3, the method 300 further includes, at block 320, determining whether any additional energy storage devices in the array require charge level evaluation. If other energy storage devices are left, the method 300 can return back, e.g., to block 302 to receive the voltage level for the next energy storage device. This feature allows the method 300 to iteratively interrogate all of the energy storage devices in the array to disconnect other "dead" energy storage devices and/or to identify other energy storage devices that require additional charging. On the other hand, if there are no other energy storage devices that require analysis, the method 300 continues, at block 308, to generate an output encoding instructions to direct power from power sources as set forth herein.

In one embodiment, the method 300 can also include steps for calculating the low voltage threshold (e.g., at block 322), e.g., after disconnecting energy storage devices that do not satisfy the disconnect threshold. This step for calculating can maintain the low voltage threshold value as an average voltage across the energy storage devices in the array that remain connected in the array. For purposes of one example, and with reference to FIG. 1, the initial low voltage threshold may comprise an average voltage across all of the energy storage devices 112, 114, 116 in the array 110. If one of the energy storage devices (e.g., the energy storage device 112) is disconnected, the method 300 can recalculate the average voltage across the energy storage devices 112, 114 that remain connected in the array 110.

The method 300 may also include steps for activating and/or operating indicators that are tagged as non-performing (e.g., that are disconnected and that are identified with the low voltage tag). Exemplary indicators may include lights (e.g., light-emitting diodes) of varying colors for each tag and audible sounds. When utilized in conjunction with a user interface on a display, the indicators may modify the user interface to provide visual indication to the end user of the tag assigned to the respective energy storage devices. Moreover, the method 300 may include steps for generating an output message, e.g., in the form of an email message, text message, and the like. The output message can alert individuals of issues and/or problems. In one example, the output message may identify use of an emergency backup power unit (e.g., a fuel cell), that can be activated in the event that other power sources that are part of the system are not available and/or are not generating sufficient power output. The output message can, in one implementation, provide an alarm and/or alert message, e.g., that identifies activation of the emergency backup power unit.

Figure 4:
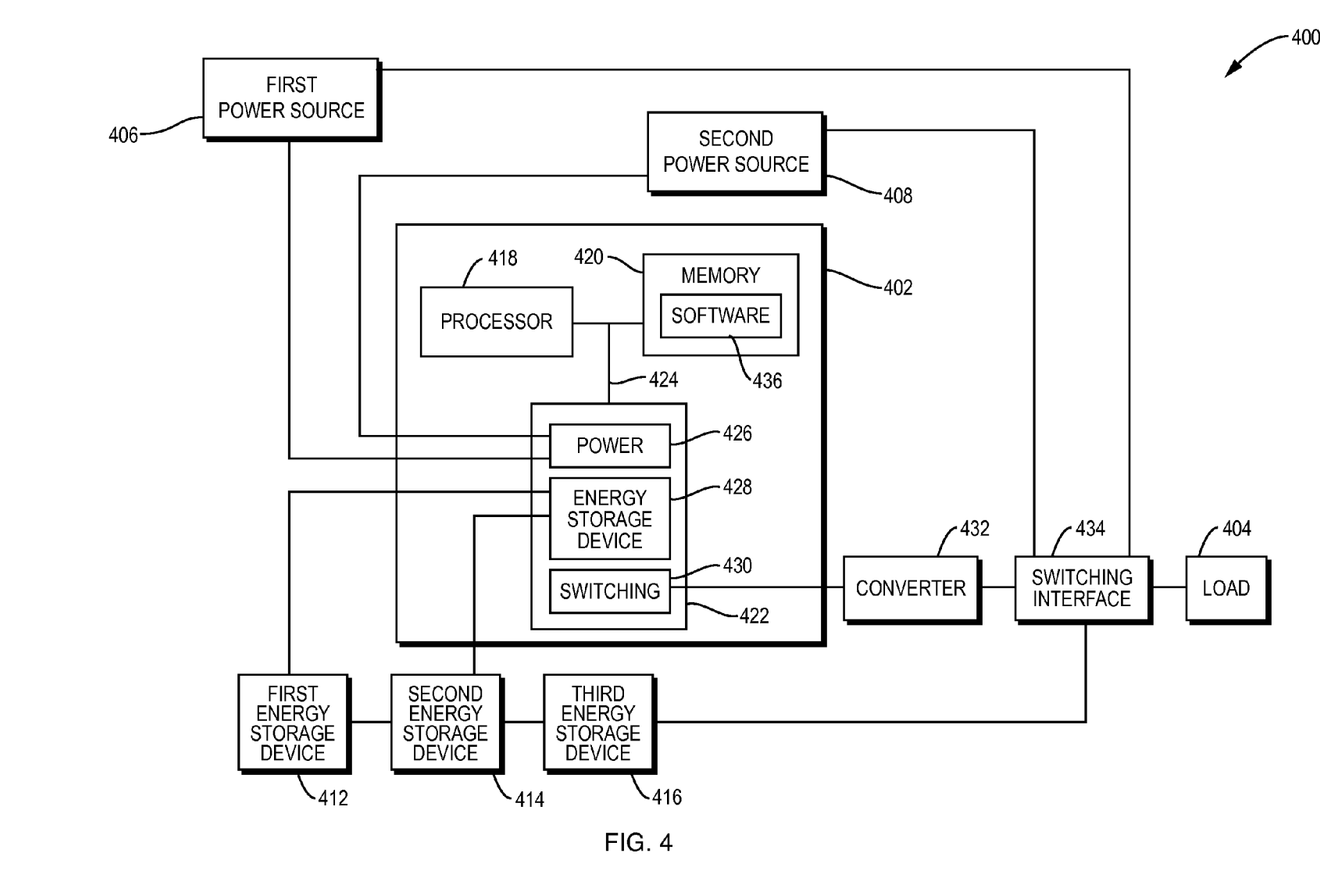
FIG. 4 depicts a high-level wiring schematic of an exemplary embodiment of a remote pump system.

FIG. 4 depicts a schematic diagram that presents, at a high level, a wiring schematic for an embodiment of a pump system 400 that can distribute power from the first power source 406 and the second power source 408 among the load 404 and the first energy storage device 412, the second energy storage device 414, and the third energy storage device 416. In one embodiment, the power management device 402 includes a processor 418, memory 420, and control circuitry 422. Busses 424 couple the components of the power management device 402 together to permit the exchange of signals, data, and information from one component of the power management device 402 to another. In one example, the control circuitry 422 includes power source sensing circuitry 426 which couples with the power sources 406, 408. The control circuitry 422 also includes energy storage device characteristic sensing circuitry 428 that couples with the energy storage devices 412, 414, 416 and switching drive circuitry 430, which may couple with a signal converter 432 (e.g., a digital-to-analog converter). The signal converter 432 couples with a switching interface 434, which directs power to the load 404 and one or more of the energy storage devices 412, 414, 416 as contemplated herein. As also shown in FIG. 4, memory 420 can include one or more software programs 436 in the form of software and/or firmware, each of which can comprise one or more executable instructions configured to be executed by the processor 418.

This configuration of components can dictate operation of the power management device 402 to analyze data, e.g., information encoded by signals from power sources 406, 408 and/or energy storage devices 412, 414, 416, to identify the primary and secondary power sources as well as to assign one or more tags. The power management device 402 can also provide signals (or inputs or outputs) to change the configuration of the switching interface 434. The configuration can direct the power from the power sources 406, 408 via one or more electrical connections that couple the power sources 406, 408 with the load 404 and the energy storage devices 412, 414, 416 as desired. Examples of the switching interface 434 can include a variety of electrical components, e.g., metal-oxide field effect transistors (MOSFETS) that are switchable between positions to direct the power as set forth herein. In this connection, the converter 432 may be required to modify signals from the switching drive circuitry 430 to appropriate formats and/or readable indications by the components of the switching interface 434.

The power management device 402 (and the other components of system 400) and its constructive components can communicate amongst themselves and/or with other circuits (and/or devices), which execute high-level logic functions, algorithms, as well as executable instructions (e.g., firmware instructions, software instructions, software programs, etc.). Exemplary circuits of this type include discrete elements such as resistors, transistors, diodes, switches, and capacitors. Examples of the processor 418 include microprocessors and other logic devices such as field programmable gate arrays ("FPGAs") and application specific integrated circuits ("ASICs"). Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

The structure of the components in the power management device 402 can permit certain determinations as to selected configuration and desired operating characteristics that an end user convey via the graphical user interface or that are retrieved or need to be retrieved by the device. For example, the electrical circuits of the power management device 402 can physically manifest theoretical analysis and logical operations and/or can replicate in physical form an algorithm, a comparative analysis, and/or a decisional logic tree, each of which operates to assign the output and/or a value to the output that correctly reflects one or more of the nature, content, and origin of the changes that occur and that are reflected by the inputs to the power management device 402 as provided by the corresponding control circuitry, e.g., in the control circuitry 422.

In one embodiment, the processor 418 is a central processing unit (CPU) such as an ASIC and/or an FPGA that is configured to instruct and/or control operation of one or more devices. This processor can also include state machine circuitry or other suitable components capable of controlling operation of the components as described herein. The memory 420 includes volatile and non-volatile memory and can store executable instructions in the form of and/or including software (or firmware) instructions and configuration settings. Each of the control circuitry 422 can embody stand-alone devices such as solid-state devices. Examples of these devices can mount to substrates such as printed-circuit boards and semiconductors, which can accommodate various components including the processor 418, the memory 420, and other related circuitry to facilitate operation of the power management device 402.

However, although FIG. 4 shows the processor 418, the memory 420, and the components of the control circuitry 422 as discrete circuitry and combinations of discrete components, this need not be the case. For example, one or more of these components can comprise a single integrated circuit (IC) or other component. As another example, the processor 418 can include internal program memory such as RAM and/or ROM. Similarly, any one or more of functions of these components can be distributed across additional components (e.g., multiple processors or other components).

Figure 5:
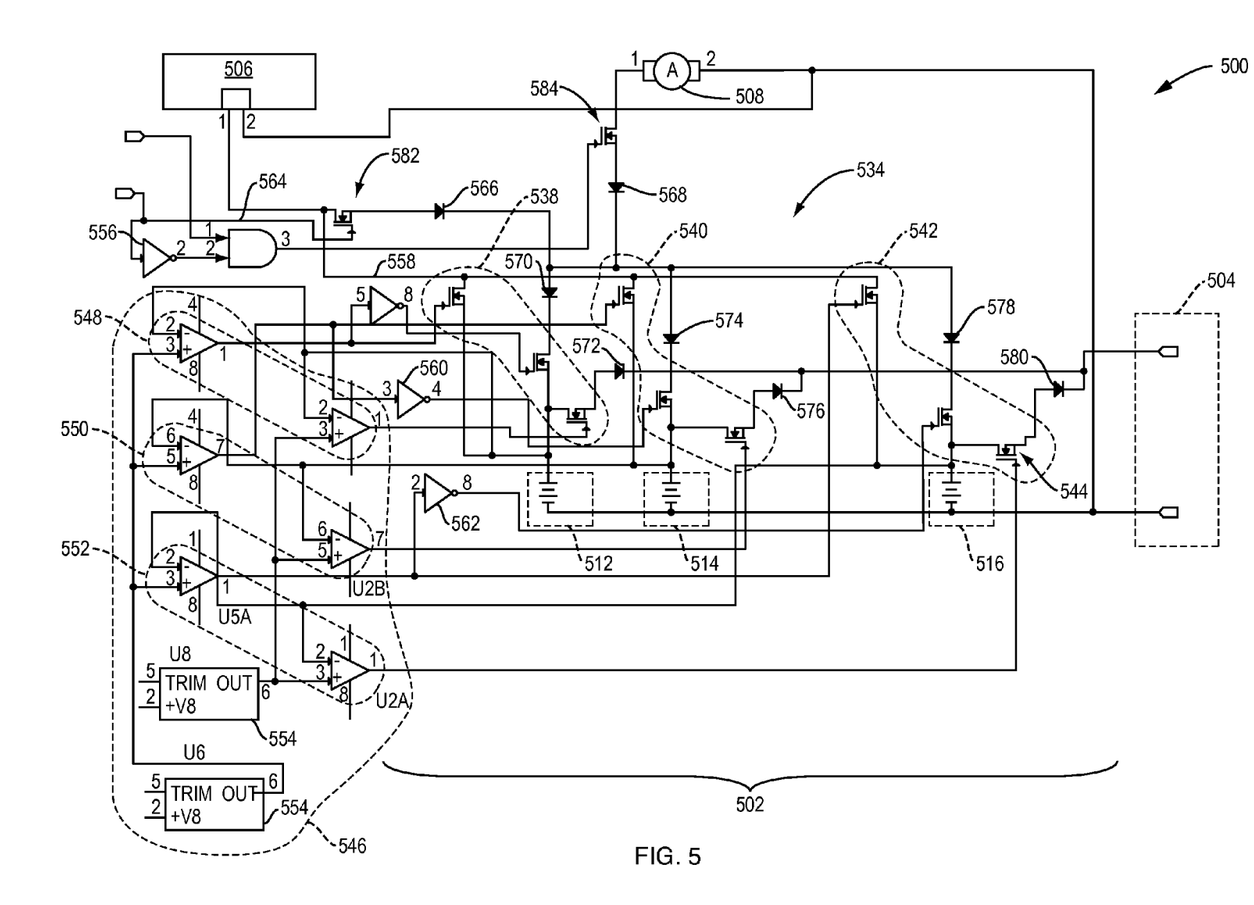
FIG. 5 depicts a high-level wiring schematic of an exemplary embodiment of a remote pump system.

FIG. 5 depicts a schematic diagram that presents, at a high level, a wiring schematic that describes topology for an embodiment of a pump system 500 that can distribute power from the first power source 506 and the second power source 508 among the load 504 and the first energy storage device 512, the second energy storage device 514, and the third energy storage device 516. In the exemplary topology of FIG. 5, the power management device 502 includes a switching interface 534, which utilizes a plurality of switching modules (e.g., a first switching module 538, a second switching module 540, and a third switching module 542) that include a plurality of switches 544.

A comparator module 546 couples with the switching interface 534 to change the position of the switches 544. The comparator module 546 includes one or more comparator elements (e.g., a first comparator element 548, a second comparator element 550, and a third comparator element 552) and reference elements 554. In one example, the reference elements 554 generate a reference voltage for use with the comparator elements 548, 550, 552. The power management device 502 can also include a variety of discrete elements that help facilitate operation of the switches 544 and/or to perform other functions to distribute power from the power sources 506, 508. Examples of these discrete elements include amplifiers (e.g., amplifiers 556, 558, 560, 562), gate devices (e.g., AND gate 564), diodes (e.g., diodes 566, 568, 570, 572, 574, 576, 578, 580), and power coupling switches (e.g., switches 582, 584).

Examples of the comparator module 546 can take the place of processors (e.g., processor 418 of FIG. 4) to generate outputs that direct power from power sources 506, 508 as desired. In one example, the comparator modules 548, 550, 552 monitor the output voltage of the energy storage devices 512, 514, 516 and, as shown in FIG. 5, can generate outputs to change to the configuration of the switches 544 in the switches modules 538, 540, 542. These configurations can disconnect the energy storage devices 512, 514, 516 (if necessary) and/or couple power from one or more of the power sources 506, 508 to charge the energy storage devices that require additional charging.

In view of the foregoing discussion, one or more of the steps of the methods 200 and 300 can be coded as one or more executable instructions (e.g., hardware, firmware, software, software programs, etc.). These executable instructions can be part of a computer-implemented method and/or program, which can be executed by a processor and/or processing device. Examples of the power management device (e.g., power management device 102 of FIG. 1 and power management device 302 of FIG. 4) can execute these executable instructions to generate certain outputs, e.g., a signal that encodes instructions to change the position of the diffuser vanes as suggested herein.

A technical effect afforded embodiments of the systems and methods disclosed herein is to facilitate distribution of power from sources in remote pump systems. Implementation of the methods, for example, can monitor performance of energy storage devices in the power system to identify energy storage devices that require recharging. The methods can also compare performance of the power sources against one another, and/or against a pre-determined criteria (e.g., calendar). These steps can help properly distinguish between a plurality of sources to identify, for example, the power sources with relatively higher power output than other sources and use the higher-output power source to power the components of the pump system.

Moreover, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. Examples of a computer readable storage medium include an electronic, magnetic, electromagnetic, and/or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms and any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power management device for distributing power in a pump system, said power management device comprising:
   a processor;
   a memory coupled with the processor; and
   executable instructions stored in the memory and configured to be executed by the processor, the executable instruction comprising instructions for:
      receiving signals encoding an operating characteristic for energy storage devices in an array;
      comparing the operating characteristic to a performance metric;
      assigning a tag to the energy storage devices in the array, the tag including a first tag that identifies energy storage devices with one or more operating characteristics that fail to satisfy the performance metric; and
      generating an output encoding instructions to direct power from a first power source and a second power source to the energy storage devices in response to the presence of the first tag; and
      designating the first power source and the second power source as a primary source and a secondary source,
   wherein the primary source couples with energy storage devices in the array that do not have the first tag.

2. The power management device of claim 1, wherein the performance metric includes a first threshold value for a charge level of the energy storage devices, and wherein the first tag identifies energy storage devices in which the charge level is at or below the threshold value.

3. The power management device of claim 2, further comprising instructions for calculating the threshold value as an average voltage across the energy storage devices in the array.

4. The power management device of claim 2, further comprising instructions for disconnecting energy storage devices in which the charge level is at or below a second threshold value that is less than the first threshold value.

5. The power management device of claim 1, further comprising a switching interface with switches that change position in response to the output, wherein the switching interface has a first configuration that defines a first position for the switches to direct power from the first power source and the second power source to the energy storage devices with the first tag.

6. The power management device of claim 5, further comprising a converter element that converts the output from a digital signal to an analog signal, wherein the switches operate in the first position in response to the analog signal.

7. The power management device of claim 1, wherein the primary source has an output power that is greater than the output power of the secondary power source.

8. The power management device of claim 1, further comprising instructions for accessing a chronological feature that defines operation of the first power source and the second power source as the primary source and the secondary source.

9. The power management device of claim 8, wherein the chronological feature comprises a pre-programmed calendar.

10. The power management device of claim 1, wherein the executable instructions comprise instructions for referencing a chronological-type parameter to designate the first power source and the second power source as the primary source and the secondary source, wherein the chronological-type parameter indicates optimal conditions for operation of the first power source and the second powers source.

11. A system comprising:
   a plurality of power sources comprising a first power source and a second power source;
   a power management device coupled with the first power source and the second power source; and
   an array of energy storage devices coupled with the power management device,
   wherein the power management device comprises a control circuit with switches that have a first position to direct power from the first power source and the second power source to energy storage devices in the array that have a charge level that fails to satisfy a performance metric,
   wherein the control circuit comprises a processor, memory, and executable instructions stored on memory and configured to be executed by the processor, the executable instruction comprising instructions for:
      receiving signals encoding an operating characteristic for the energy storage devices;
      comparing the operating characteristic to the performance metric;
      assigning a tag to the energy storage devices in the array, the tag including a first tag that identifies energy storage devices in which the charge level fails to satisfy the performance metric; and
      generating an output encoding instructions to place the switches in the first position in response to the presence of the first tag,
   wherein the first position corresponds with a change in the charge level of the energy storage devices that are identified by the first tag,
   wherein the control circuit designates the first power source and the second power source as a primary source and a secondary source, and
   wherein the primary source couples with energy storage devices in the array that do not have the first tag.

12. The system of claim 11, wherein the control circuit comprises a comparator module couple with the switches, wherein the comparator module comprises a comparator element for each of the energy storage devices that compares the charge level of the energy storage devices with a reference voltage, and wherein the switches enter the first position when the charge level is at or below the reference voltage.

13. The system of claim 11, wherein the plurality of power sources comprise a solar panel and a wind turbine.

14. The system of claim 11, further comprising a switching interface coupled to the control circuit, the switching interface configured to direct power to a load and the energy storage devices in the array.

15. A method, comprising:
   at a power management device comprising a control circuit:
      receiving signals encoding an output voltage for energy storage devices in an array;
      comparing the output voltage to a threshold value;
      assigning a tag to the energy storage devices in the array, the tag including a first tag that identifies energy storage devices in which the output voltage is less than or equal to the threshold voltage;
      generating an output encoding instructions to direct power from a first power source and a second power source to the energy storage devices that exhibit the first tag to change the operating characteristic of the energy storage devices that are identified by the first tag; and
      designating the first power source and the second power source as a primary source and a secondary source,
   wherein power output from the primary source is greater than power output from the secondary source, and
   wherein the primary source couples with energy storage devices in the array that do not have the first tag.

16. The method of claim 15, further comprising calculating the threshold value as an average voltage across the energy storage devices in the array.

17. The method of claim 15, further comprising disconnecting energy storage devices in which the charge level is at or below a disconnect threshold.

18. The method of claim 17, wherein the first tag identifies energy storage devices in which the output voltage is less than or equal to a low voltage threshold, and wherein the low voltage threshold is greater than the disconnect threshold.

19. The method of claim 15, wherein the executable instructions comprise instructions for disconnecting one or more of the energy storage devices from the array having a charge level below a minimum voltage threshold.

20. The method of claim 19, wherein the minimum voltage threshold corresponds with an average voltage across the energy storage devices in the array.

* * * * *